(12) United States Patent
Price

(10) Patent No.: US 7,036,632 B1
(45) Date of Patent: May 2, 2006

(54) ADJUSTABLE CANTILEVER SUPPORT FOR TREE-MOUNTED BLINDS

(75) Inventor: Terry L. Price, Sheridan, MI (US)

(73) Assignee: High House Blinds, LLC, Sheridan, MI (US)

( * ) Notice: Subject to any disclaimer, the term of this patent is extended or adjusted under 35 U.S.C. 154(b) by 0 days.

(21) Appl. No.: 10/703,728

(22) Filed: Nov. 7, 2003

(51) Int. Cl.
*H01M 31/00* (2006.01)

(52) U.S. Cl. .................... 182/187; 248/219.1
(58) Field of Classification Search ............. 182/187, 182/188, 135, 116; 248/219.1
See application file for complete search history.

(56) References Cited

U.S. PATENT DOCUMENTS

| | | | | |
|---|---|---|---|---|
| 3,776,498 A | * | 12/1973 | Peters et al. ............ | 248/219.1 |
| 3,854,551 A | * | 12/1974 | Lindow ..................... | 182/187 |
| 4,069,891 A | * | 1/1978 | McClung .................. | 182/187 |
| 4,120,379 A | | 10/1978 | Carter | |
| 5,316,105 A | * | 5/1994 | Reggin et al. ............ | 182/187 |
| 5,363,941 A | * | 11/1994 | Richard .................... | 182/187 |
| 5,458,215 A | * | 10/1995 | Burgin ...................... | 182/187 |
| 2002/0078988 A1 | | 6/2002 | Valpredo | |
| 2003/0178255 A1 | * | 9/2003 | Auer ......................... | 182/187 |
| 2004/0108165 A1 | * | 6/2004 | Poole et al. .............. | 182/136 |

* cited by examiner

*Primary Examiner*—Alvin Chin-Shue
(74) *Attorney, Agent, or Firm*—Northern Michigan Patent Law, PLC

(57) ABSTRACT

An adjustable cantilever support structure for a hunting type blind, the support structure being secured to the side of a tree trunk and adjustable in two planes to accommodate a crooked or leaning trunk so as to position the blind with a level floor.

6 Claims, 9 Drawing Sheets

ADJUSTABLE CANTILEVER SUPPORT FOR TREE-MOUNTED BLINDS

FIELD OF THE INVENTION

The present invention is in the field of hunting blinds of the type used by deer hunters, and more particularly tree-stands and blinds mounted in trees.

BACKGROUND OF THE INVENTION

This application is co-pending with a commonly-owned application by the same inventor for a walled, blind-style hunting enclosure removably mounted to the side of a tree in cantilever fashion. The enclosure is fully walled and in a preferred version is also roofed, yet is lightweight, easy to put up, and easy to take down. The enclosure and its cantilever support are designed to be assembled at the base of the tree to which it is to be mounted, and hauled vertically up and down the side of the tree trunk to be placed and secured in the desired hunting position.

The cantilever support is adapted to be fastened to the side of the tree trunk at a desired hunting height. However, it is often difficult for a hunter to find a nice, straight, reasonably vertical tree at what is otherwise a perfect hunting spot, for example within close, clear bow or rifle shot of a heavily used deer trail. Or, having found a tree that looks likely from the ground, the hunter is dismayed upon raising the blind to the desired height that the trunk is actually crooked or leaning, and the blind cannot be mounted with the floor relatively level. Anyone who has spent the day in the cramped confines of a ground blind or in a precariously perched treestand will appreciate the need for a reasonably level floor in a tree-mounted blind.

The cantilever support of the tree-mounted blind is a generally L-shaped structure with multiple anchor blocks spaced vertically along a rigid trunk-securing arm, and with the blind supported on a perpendicular cantilever arm. The anchor blocks secure the vertical trunk-securing arm generally parallel to the tree trunk, such that the blind is also generally parallel to the tree trunk at that point. If the tree leans, or is crooked at the point where the blind is attached, the blind will not be level.

BRIEF SUMMARY OF THE INVENTION

The invention is an adjustable cantilever support for mounting such blinds in level fashion on leaning or crooked trees. The adjustable support can also be used in the event that a perfectly straight, vertical tree is found, but easily handles the more commonly found imperfect tree. The adjustable support allows the blind to be adjusted in one or more axes or planes relative to the tree trunk to achieve a level floor.

In a first embodiment, the adjustable support uses a modified, releasable connection between its lower end and the lower anchor block to provide a degree of adjustment between the lower end of the cantilever support and the tree. The lower anchor block is secured to the tree and is releasable from the rigid support and its upper anchor block, and is axially longer than the upper anchor block, extending further from the tree. The lower end of the cantilever support is designed to slide over the lower anchor block toward and away from the tree (in a "z"-axis plane) and left and right generally parallel to the tree (in an "x"-axis plane). The lower end of the support is further designed to be secured to the lower anchor block once the desired adjustment is made in either or both of the x and z directions. The range of adjustments is on the order of zero to fifteen degrees, suitable for many situations.

In a modified version of the first embodiment, the lower anchor block has an offset portion providing a greater range of adjustment favoring one direction. The offset anchor block is preferably reversible so that the direction in which the greater range of adjustment is available can be selected by simply reversing the orientation of the block on the tree.

In a second embodiment of the invention, the lateral cantilever arm portion is axially rotatable relative to the vertical tree-securing arm of the support, making it adjustable in the x-axis plane for left and right adjustment. In a further form the cantilever arm is also independently adjustable in the z-axis plane for fore and aft tilt adjustments. In both planes this second embodiment offers a greater range of adjustment than the first embodiment.

In a preferred form of the second embodiment, the vertical arm of the cantilever support is fixed to the tree in a multipoint connection, with an inner portion of the vertical arm rigidly connecting the upper and lower anchor blocks, and an outer portion rotatably mounted to the inner and supporting the horizontal arm. In a most preferred form the inner and outer portions of the vertical arm comprise pivotally connected plates with a cam bolt and slot arrangement that allows an overlapping degree of travel to either side, defining a continuous arcuate range of adjustment.

These and other features and advantages of the invention will become apparent upon a further reading of the specification in light of the accompanying drawings.

DETAILED DESCRIPTION OF THE INVENTION

Figure 1:
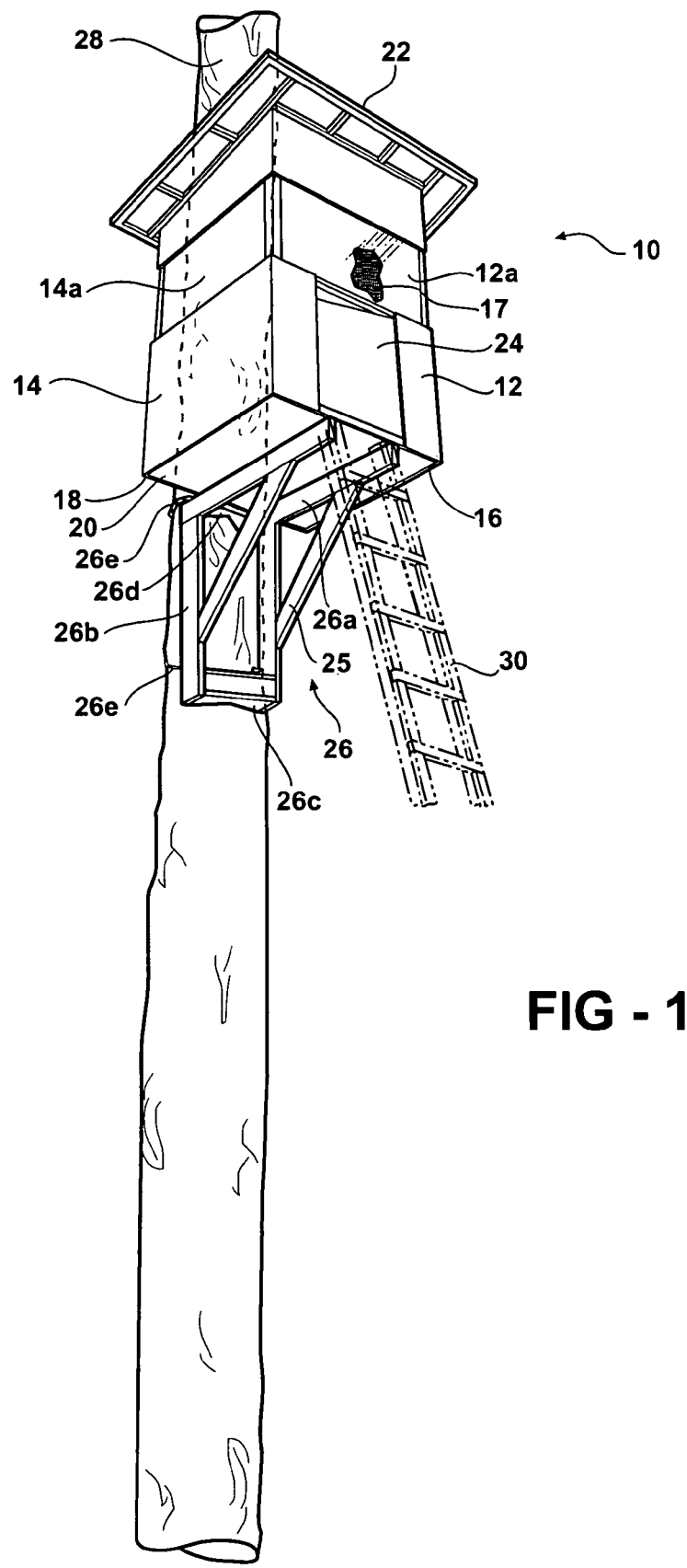
FIG. 1 is a front perspective view of a tree-mounted blind on a non-adjustable cantilever support, viewed from an angle below the level of the blind.

Referring to FIG. 1, a tree-mounted blind enclosure 10 according to the invention is shown mounted on a tree 28, for example between ten and twenty feet off the ground. Blind 10 is an enclosed structure, in the illustrated example a fully walled rectangular structure with front wall 12, side walls 14 and 16, and rear wall 18, all formed from suitable wood such as plywood with appropriate internal framing. Walls made from other rigid materials such as plastics or even metals are possible, although wood is believed to be the best material. Other walled shapes such as hexagons may be desirable for certain features or appearances.

Blind 10 has a solid floor 20 and a solid roof 22, for example also made from plywood and suitable framing members, thus providing a complete, weatherproof enclosure for a hunter in the tree. Access to the inside of blind 10 is through a door 24 formed in front wall 12, reached by ladder 30 depending from front wall 12. The ladder is preferably secured in place during the hunting season, but can also be removed and stored as desired between uses. The door can be placed in walls other than the front wall, depending on the desired angle of ladder access to the blind. The illustrated blind weighs on the order of two or three hundred pounds once fully assembled.

Figure 2:
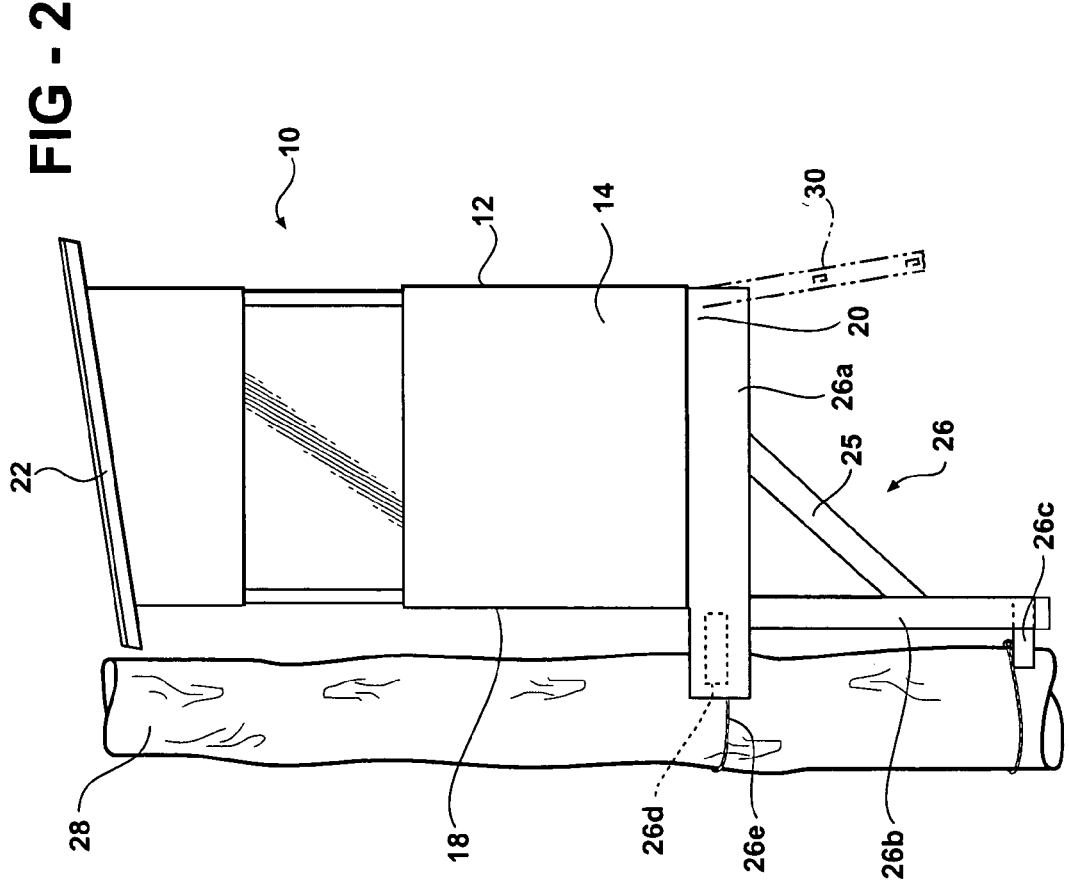
FIG. 2 is a side elevation view of the support of FIG. 1.

As shown in FIGS. 1 and 2, blind 10 is mounted in cantilever fashion to the side of the trunk of tree 28, supported on a generally L-shaped cantilever mount 26 so as to have rear wall 18 essentially squarely mounted next to the tree trunk. The floor of the blind rests on and is secured to horizontal cantilever arm portion 26a (in the illustrated embodiment comprising a pair of spaced, parallel wooden rails). Vertical trunk-securing portion 26b is removably secured against the side of tree 28 via lower and upper anchor blocks 26c and 26d tensioned laterally against the tree trunk with suitably strong cables, chains, or straps 26e. Triangular bracing 25 is added to the L-shaped cantilever support for strength.

Blind 10 is accordingly supported in cantilever fashion directly adjacent the vertical tree trunk, essentially paralleling the trunk It will be understood that the terms "horizontal", "vertical", and "parallel" used in reference to the relationship of the cantilever support are used in an approximate sense with respect to the tree and ground, since no tree is perfectly straight and vertical, and since the position of a given blind and its support will vary somewhat from one installation to another on different trees.

Figure 3:
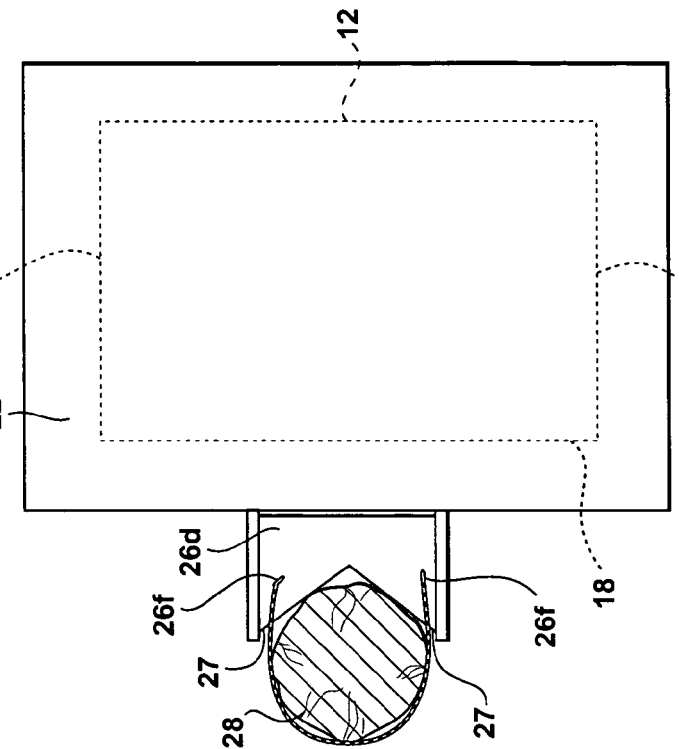
FIG. 3 is a top plan view of the support of FIG. 1, with the tree trunk sectioned.

As best shown in FIGS. 2 and 3, the anchor blocks have wide, V-shaped tree-engaging faces 27 for a cradled, self-centering wedge fit against tree trunks of varying shape and diameter. In the illustrated embodiment, the anchor blocks are made from wood, providing non-damaging surfaces against the bark of the tree. In the illustrated embodiment the blocks are each made from stacks of several flat boards, for example particle board and/or sawn lumber, stacked and locked together into a block with framing members and nails, screws, clamping members and/or strong adhesive. Eyebolts 26f are secured deeply into the anchor blocks, with hooks or eyes on their protruding ends to receive the ends of chains, cables or straps that can be tensioned around the tree.

In the illustrated example of FIGS. 2 and 3, upper and lower anchor blocks 26c and 26d are identical. The wide and relatively shallow nature of the V-shaped anchor block faces 27, and their rigid vertical spacing on the trunk in a two-point tensioned connection, securely centers and locks the cantilevered mounting structure 26 (and blind 10) both vertically and laterally to the side of the tree. It will be understood that the angle and size of the V-shaped tree-engaging faces of the blocks could differ from one another, but identically-faced blocks have been found sufficient and are preferred. It will further be understood that while the illustrated anchor blocks are preferred and offer many advantages, other means for removably anchoring the trunk-securing arm to the tree can be used.

The enclosed, tree-paralleling shape of the blind and its cantilever mount to the side of the tree allow the blind to be assembled and installed on the tree in a unique and convenient manner. The blind's walls, floor, and roof portions are preferably constructed as separate modules or sections that are easily transported and that can be quickly assembled using ordinary hand or power tools at the base of a tree, for example by bolting or screwing the sections together. The cantilever support structure 26 is formed as a separate, stand-alone module that is easily transported to the tree, fastened to the base of the tree a few inches or feet off the ground with its chains in the same manner shown higher up in FIG. 1, and used as a convenient platform to assemble the blind in place.

Figure 4:
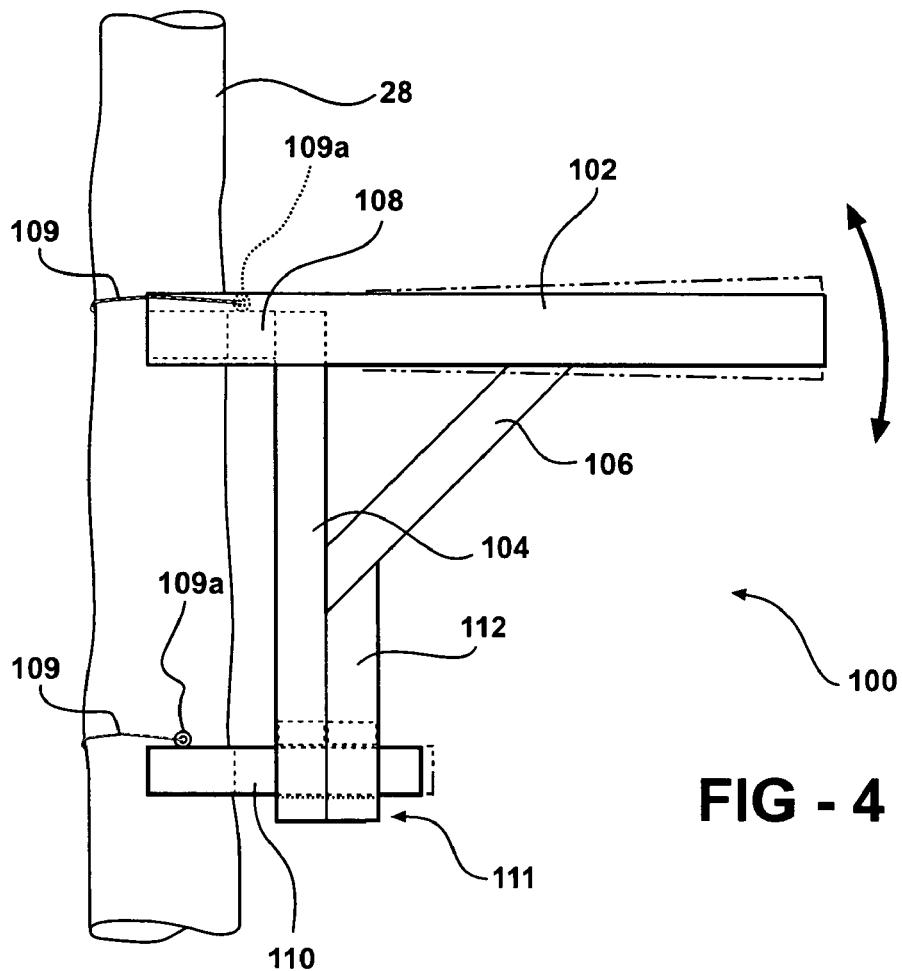
FIG. 4 is a side elevation view of a first embodiment of an adjustable support according to the invention.
Figure 5:
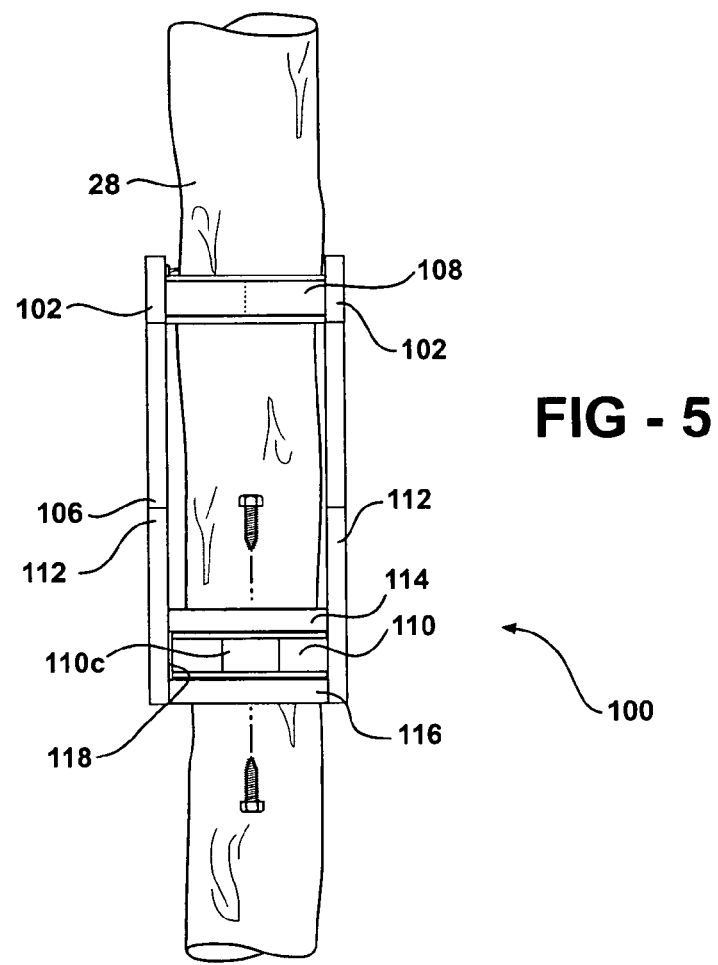
FIG. 5 is a front elevation view of the support of FIG. 4.

Referring next to FIGS. 4 through 5, a first embodiment of an adjustable cantilever support is generally denoted by reference numeral 100. Support 100 is similar to support 26 in FIGS. 1–3, with the primary difference being in the lower anchor block and the support's connection to the lower anchor block. Support 100 is generally L-shaped, with optional bracing 106, having a horizontal cantilever arm portion 102, and a vertical trunk-securing arm portion 104 secured to the side of tree 28 with anchor blocks 108, 110 using tensioned chains, cables or straps 109 secured to the anchor blocks with eyebolts 109a in the same manner shown in FIGS. 1–3. In the illustrated example, horizontal arm 102 and vertical arm 104 each comprise a pair of spaced members, for example made from wood, similar to corresponding members 26a and 26b in FIGS. 1–3. Bracing 106 is likewise a pair of spaced members connecting the spaced members of horizontal arm 102 and vertical arm 104, also made from wood, for example.

It will be understood that although pairs of spaced members are shown in the illustrated examples, more than a pair can be used, if desired. It is also possible to use single, wide members if they provide sufficient support and stability.

Upper anchor block 108 is similar to upper anchor block 26d in FIGS. 1–3, but lower anchor block 110 and its connection to the lower end of vertical trunk arm 104 are different. Lower anchor block 110 extends farther from the tree than upper anchor block 108. A lower guide portion 111 of vertical trunk arm 104 is releasably connected to the lower anchor block. When released, lower guide portion 111 is designed to slide back and forth and side to side on lower anchor block 110, giving the rigid cantilever support 100 a degree of adjustability relative to the tree in two planes. The side view of FIG. 4 best shows the vertical or z-axis plane of adjustment, while the front and plan view of FIGS. 4 and 5 best show the side-to-side or x-axis plane of adjustment. Because support structure 100 is rigid, and because the upper end of structure 100 is essentially fixed to the tree through upper anchor block 108, the degree of adjustability is limited, for example approximately fifteen degrees in each plane of adjustment. This is believed sufficient to accommodate many circumstances that a hunter will encounter.

In the illustrated embodiment of FIGS. 4 through 5, lower anchor block 110 has a main body 110a and a V-shaped tree engaging face 110b similar to upper anchor block 108. Lower anchor block 110 also includes a post portion 110c extending laterally away from the tree side of the anchor block. Post portion 110c, like the rest of anchor block 110, is preferably made from wood, whether a solid piece or several laminated layers or framed members. Post portion 110c in FIGS. 4 and 4A has a width less than block body 110a, and accordingly less than the spacing between the members of vertical trunk arm 104 separated by block 110. The lower guide end 111 of vertical arm 104 is accordingly free to move side-to-side relative to fixed post 110c, allowing the support structure a degree of mildly arcuate adjustment if the tree leans right or left. Upper anchor block 108 will accommodate this range of adjustment due to the wide, relatively shallow nature of its V-shaped tree engaging face.

Lower end 111 is also free to move toward and away from tree 28 on post 110c to accommodate a tree trunk leaning forward or backward relative to the blind. To this end, the lower ends of vertical trunk arm members 104 are bridged by a pair of spaced cross-members 114, 116 (best shown in FIG. 5) defining a guide channel 118 around anchor block post portion 110c. Lower guide end 111 is accordingly free to move toward and away from tree 28 relative to the lower anchor block 110, riding over the post portion with a mildly arcuate motion limited by the vertical spacing between cross-members 114 and 116. In practice, adjustments in the range of five to fifteen degrees in either direction have been found possible and sufficient for leveling the blind in many situations.

Once the desired left-right and fore-aft adjustments have been made on lower anchor block 110, lower end 111 is re-secured to the lower anchor block. In the illustrated embodiment lower end 111 of the cantilever support is secured directly to anchor block 110, for example with screws, bolts, or nails driven through portions of lower end 111 into block 110, and for further example through cross-members 114, 116 into the post portion 110c. Since the adjustment of lower end 111 relative to the upper end of the cantilever support may put some stress on the connection to anchor block 110, lower end 111 and its connection to the anchor block can be reinforced, for example with gussets 112 shown fastened to the individual members of vertical arm 104 and optionally to cross-members 114 and 116.

Figure 4A:
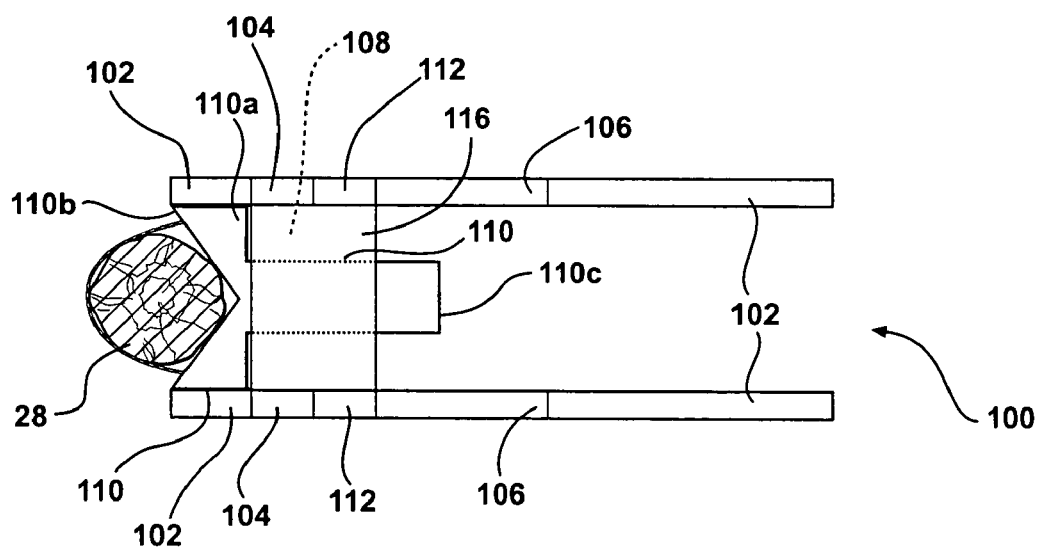
FIG. 4A is a bottom plan view of the lower anchor block of FIG. 4.
Figure 4B:
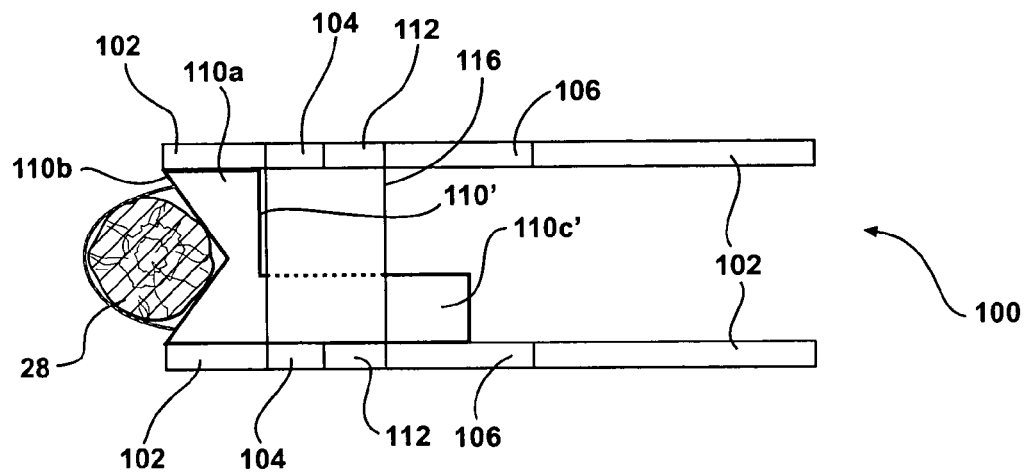
FIG. 4B is a plan view of an alternate version of the lower anchor block of FIG. 4.

In some cases it may be desired to have a greater degree of adjustment to one side or another than that provided by the symmetrical anchor block 110 of FIG. 4A. For this reason, FIG. 4B illustrates an alternate embodiment 110' of the lower anchor block having an offset post portion 110c'. This offset allows a greater degree of adjustment in the x-axis plane to one side or the other, depending on the orientation of the block. Rotating block 110' about the axis of the post allows the adjustment offset to be reversed. This is easily accomplished at the tree, since unlike the rigid, non-adjustable two point support 26 in FIGS. 1 and 2, the lower anchor block in adjustable support 100 is releasably secured to both the tree and the lower end of the support.

It will be understood that although a preferred embodiment has been described above, the manner in which the lower end 111 of rigid support 100 is made adjustable on the independent lower anchor block 110 and then is secured to the anchor block can vary in detail from the example shown.

Figure 6:
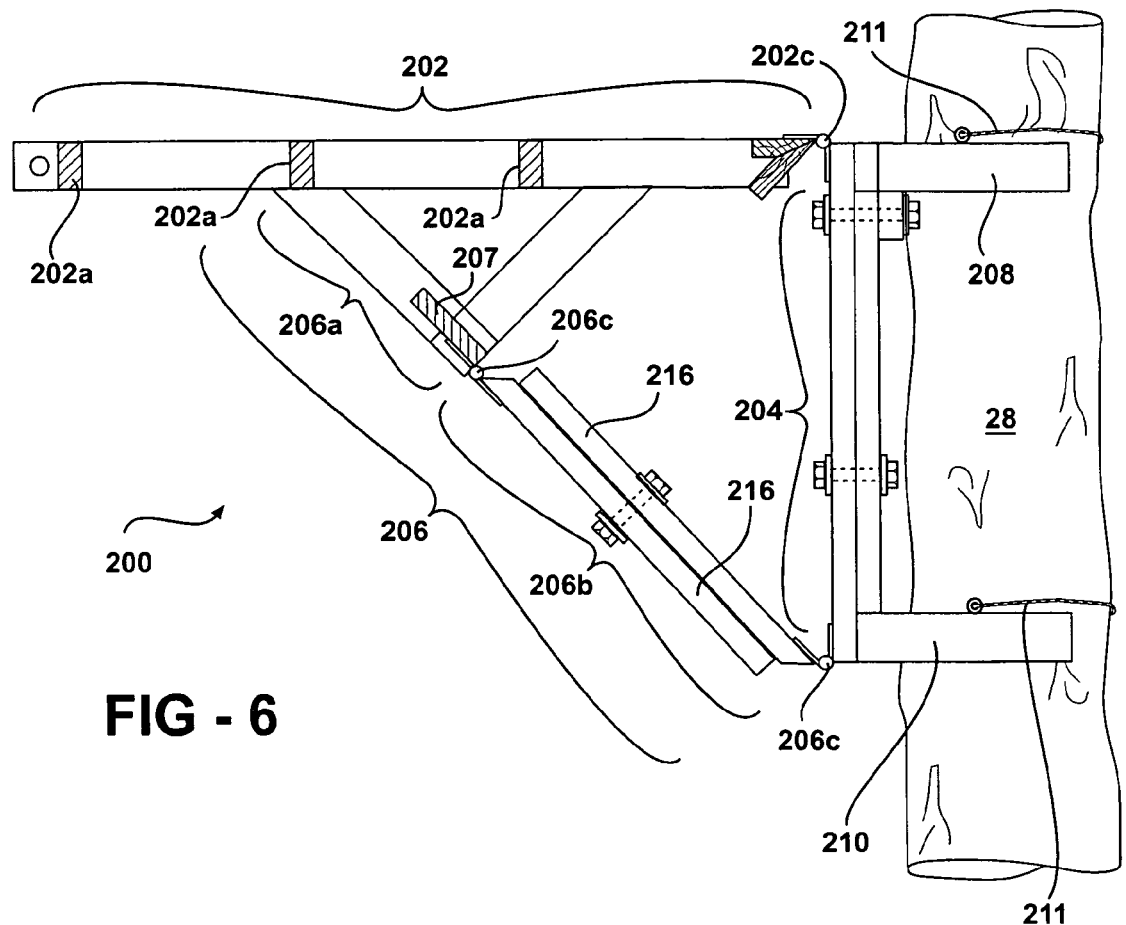
FIG. 6 is a side elevation view of a second embodiment of an adjustable blind support according to the invention.

Referring next to FIG. 6, a second embodiment of a cantilevered blind support adjustable in two planes is referred to generally by reference numeral 200. Like supports 26 and 100 illustrated above, support 200 is a generally L-shaped support secured to the side of tree 28 with tensioned anchor blocks 208, 210 and chains 211. Support 200 has a horizontal cantilever arm portion 202 on which the blind is supported and secured, and a vertical trunk-securing arm portion 204 rigidly joining anchor blocks 208 and 210. A diagonal brace structure 206 extends between an outer portion of horizontal arm 202 and a lower portion of vertical arm 204.

Brace 206 is an adjustable structure capable of raising and lowering arm 202 relative to vertical arm 204 and the tree trunk in the z-axis plane. Horizontal support arm 202 is pivotally connected to vertical arm portion 204, for example with hinges 202c. Illustrated brace 206 includes a rigid triangular knee portion 206a connected directly to arm 202, and a slide-adjustable straight extension 206b pivotally connected at one end to knee 206a and at the other end to vertical support arm 204a, for example with hinges 206c.

Figure 6A:
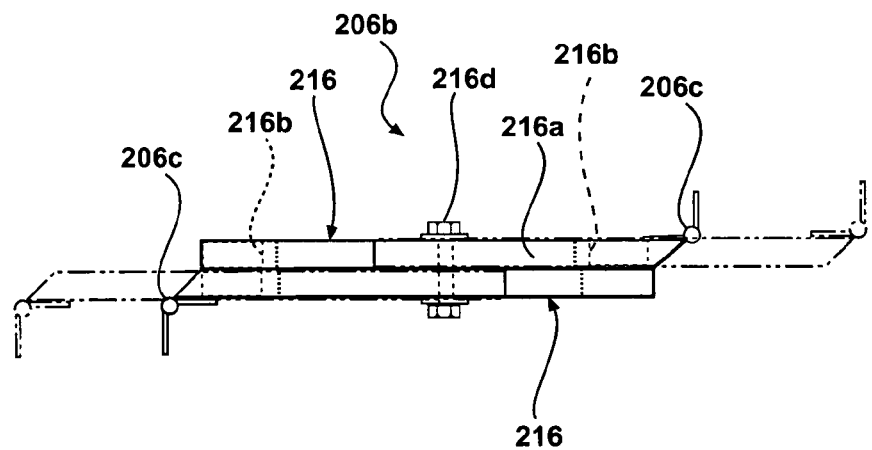
FIG. 6A is a detailed side view of an adjustable brace portion of the support of FIG. 6.
Figure 7:
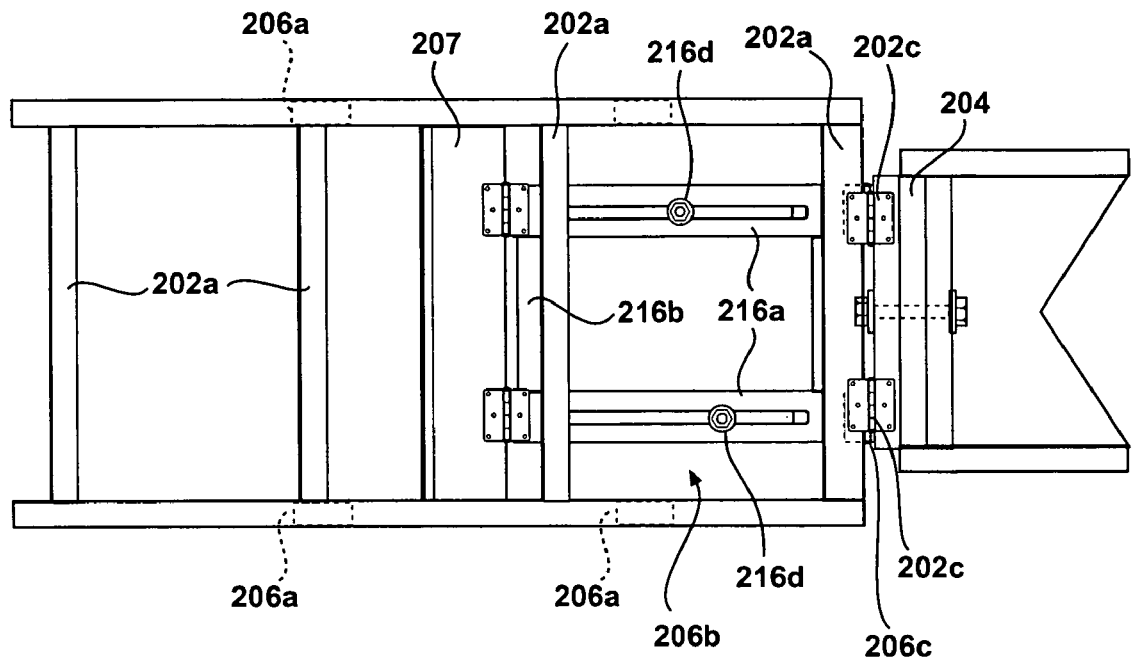
FIG. 7 is a top plan view of the support of FIG. 6.
Figure 7A:
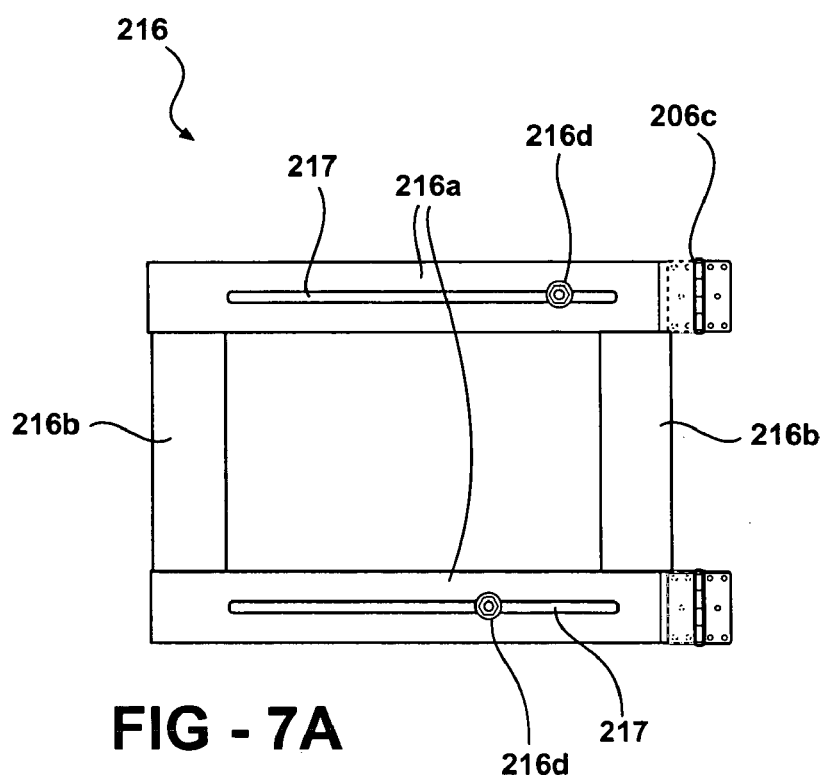
FIG. 7A is a plan view of the adjustable brace portion of the support of FIG. 6.

As best shown in FIGS. 6A, 7 and 7A, adjustable brace arm 206b comprises a pair of slidingly connected members 216, in the illustrated example each comprising a pair of slotted side members 216a and a pair of cross members 216b to form a square or rectangle. One end of each frame member 216 is provided with a set of hinges 206c, and the hinge-supporting ends are preferably beveled as shown at 216c opposite the hinges. Frame members 216 are slidingly connected to one another with slot clamps 216d extending through their aligned slots 217. The hinged end of the lower frame member is connected through hinges 206c to a cross-bar portion 207 of knee 206a, while the upper frame member is connected through hinges 206c to vertical arm 204. The beveled ends 216c provide clearance between the hinged ends of the sliding frame portions and the adjacent brace and tree surfaces as brace 206 is adjusted.

Figure 8:
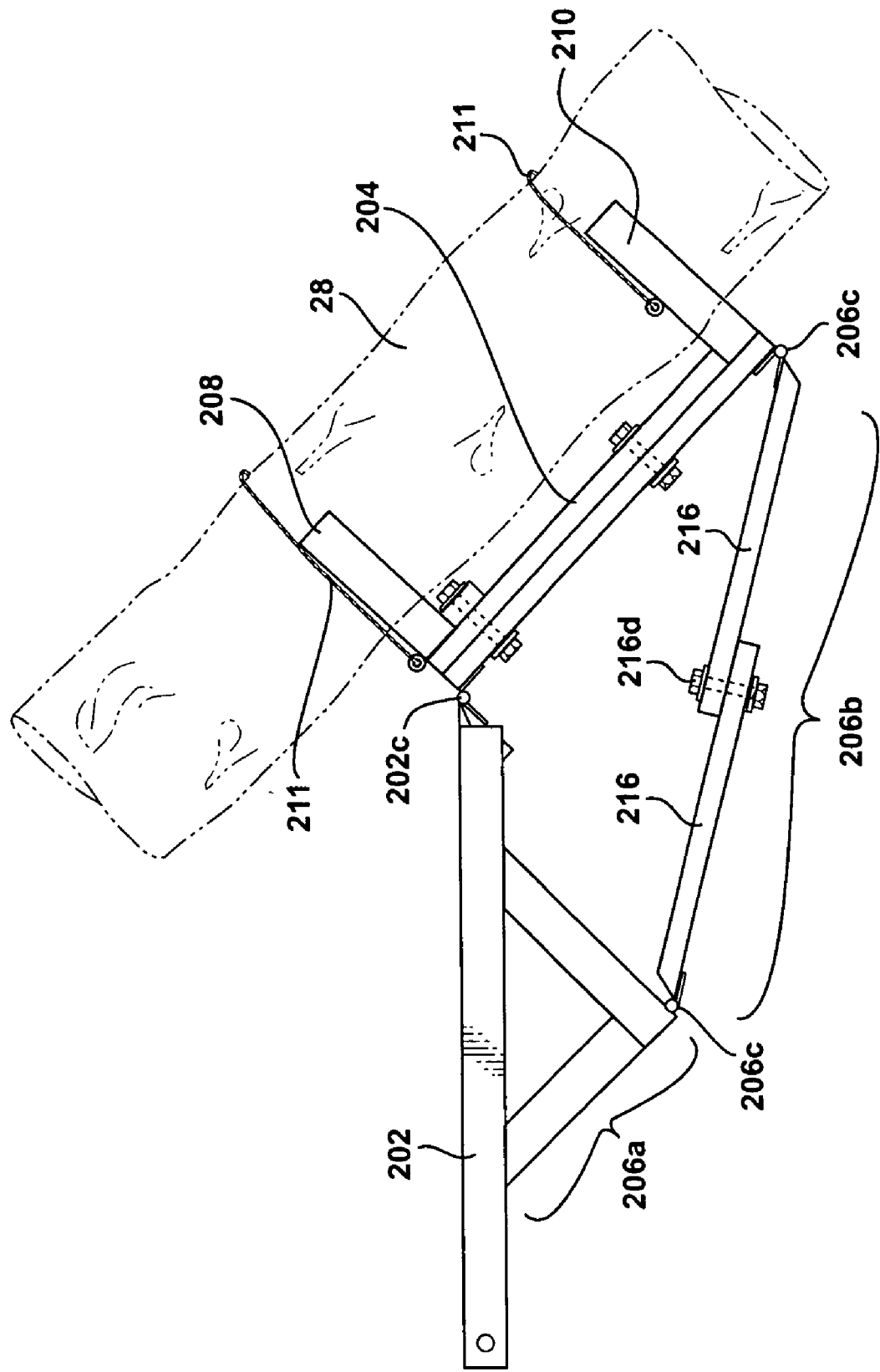
FIG. 8 is a side elevation view of the support of FIG. 6 in its maximum elevated position.
Figure 9:
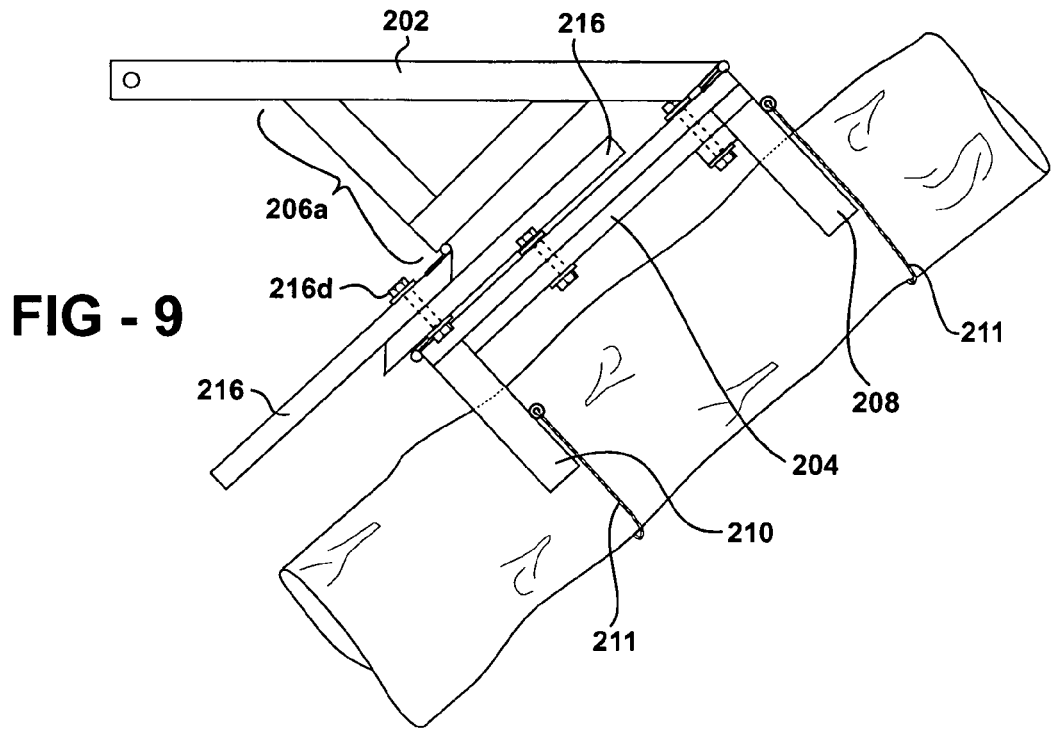
FIG. 9 is a side elevation view of the support of FIG. 6 in its maximum lowered position.

FIGS. 8 and 9 illustrate the maximum adjusted positions of horizontal arm 202 using adjustable brace structure 206. In FIG. 8, beam assembly 202 is shown raised approximately 45° from its normal position perpendicular to arm 204, accomplished by loosening the slot clamps 216d and sliding extension members 216 apart as far as they will go. Once adjusted to the desired position, the slot clamps are retightened to make the brace rigid. In FIG. 9, beam assembly 202 is shown lowered approximately 45° below horizontal, accomplished by loosening and sliding the slot clamps 216d to the lowermost end of the inner (upper) frame member 216, folding the inner frame member 216 against vertical support arm 204, and sliding outer (lower) frame member 216 toward and over the inner frame member as far as the slots allow. The slot clamps are then retightened to make the brace rigid.

It can be seen from the degree of adjustment in FIGS. 8 and 9 that in addition to the tree trunk itself, a trunk-like limb can be used to support the blind. It may be necessary to rotate the blind out of the way of the trunk/limb if the degree of tilt adjustment is severe as shown in FIG. 8.

Figure 10:
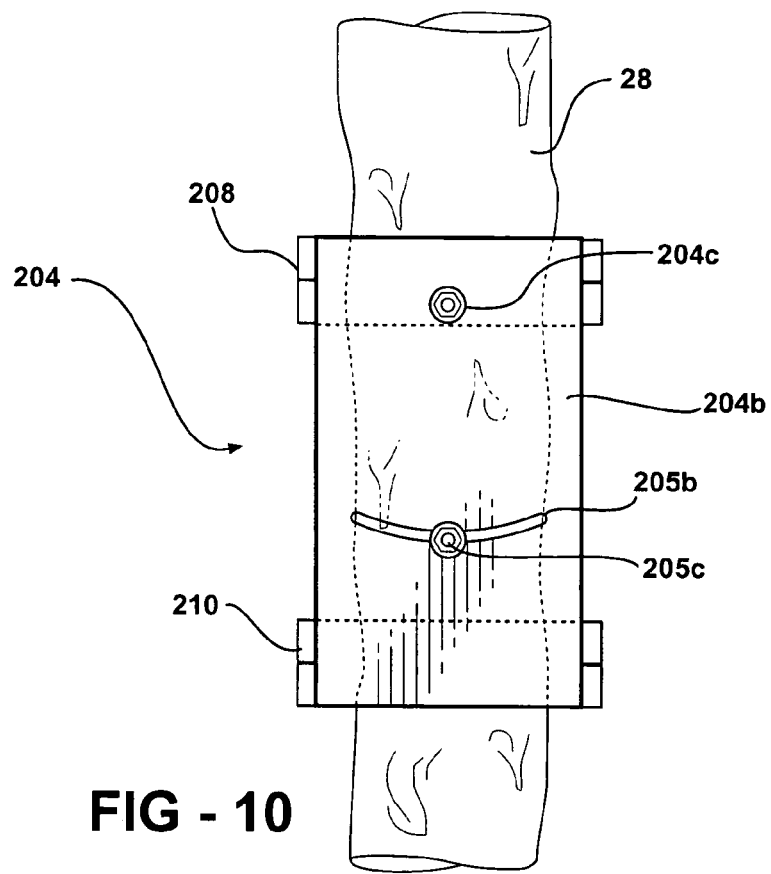
FIG. 10 is a front elevation view of the faceplate portion of the support of FIG. 6.
Figure 11:
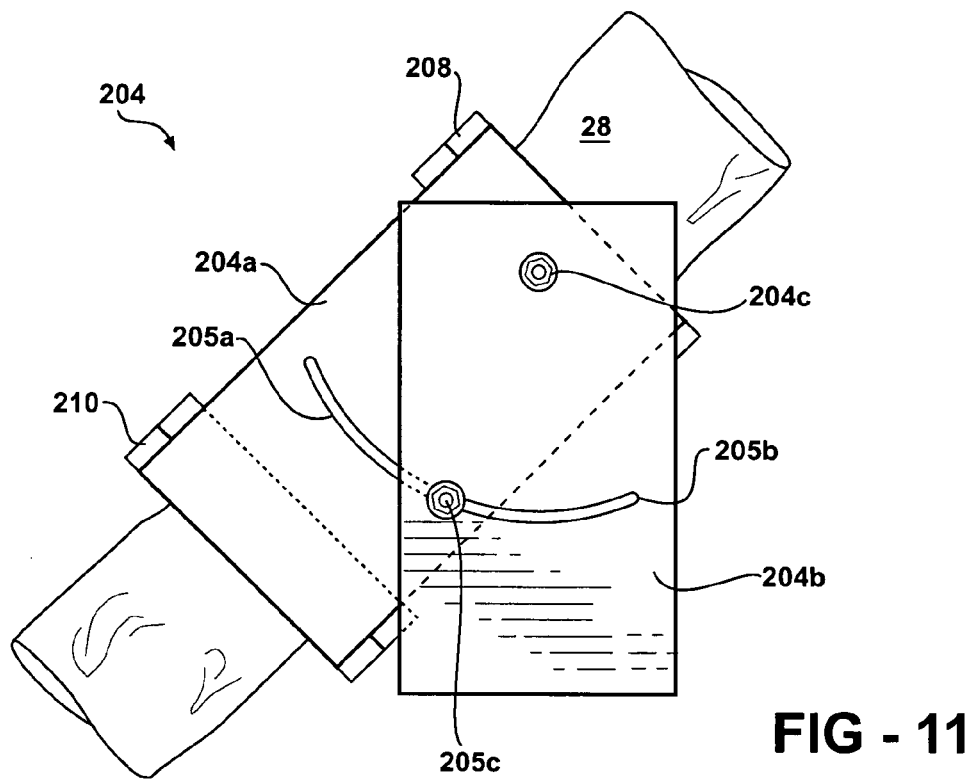
FIG. 11 is similar to FIG. 10, with the support shown in its rightmost adjusted position.
Figure 12:
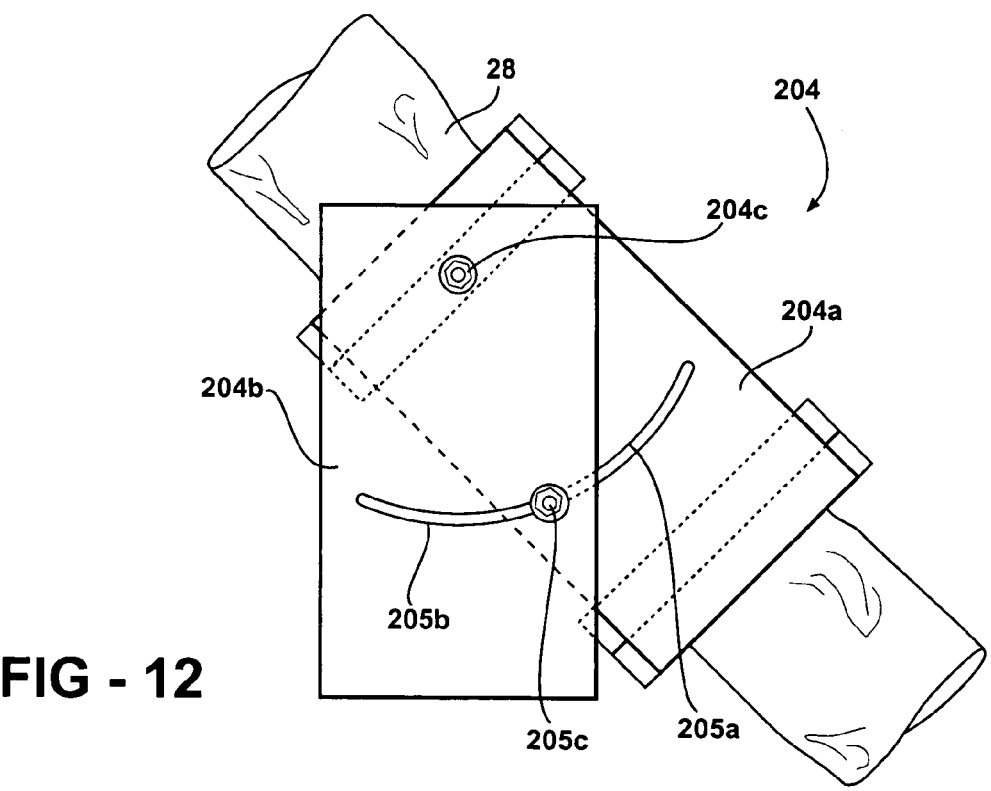
FIG. 12 is similar to FIG. 10, with the support shown in its leftmost adjusted position.

FIGS. 10 through 12 illustrate the left-right or x-axis adjustability of support 200 through a rotatable connection of the horizontal beam assembly 202 and brace 206 to vertical trunk-securing support 204. Support 204 has an inner, tree-side segment 204a rigidly connecting the anchor blocks 208 and 210, and an outer segment 204b rotatably connected to inner segment 204a. In the illustrated example, inner segment 204a is a flat plate-like member, for example a suitably strong piece of plywood or similar lumber bolted or otherwise secured to the anchor blocks. Outer segment 204b is an essentially identical flat member pivotally connected to inner segment 204a at its upper end, for example with a pivot bolt 204c. Inner and outer segments 204a and 204b have aligned arcuate slots 205a and 205b toward their lower ends, and are connected through the slots with a slot clamp 205c. By loosening the slot clamp, outer segment 204b and horizontal beam assembly 202 and brace 206 supported thereon can be rotated left or right as a unit, as best shown in FIGS. 11 and 12. Slots 205a and 205b complement one another to give a combined arcuate range of travel of approximately 90°, 45° to each side of tree 28.

It will be understood that the foregoing examples of adjustable supports for the cantilevered blind are preferred examples, and may be subject to minor modifications that will be apparent to those skilled in the art now that I have disclosed both the broad principles and the preferred ways of carrying out those principles. Many such modifications will lie within the scope of the invention as defined by the claims below.

I accordingly claim:

1. An adjustable cantilever blind support for supporting a blind structure adjacent the trunk of a tree, comprising:
    a horizontal support member adapted to extend laterally away from a side of a tree trunk when the blind support is secured to a tree;
    a vertical support member comprising a pair of substantially parallel spaced members supporting the horizontal support member at an upper end thereof and adapted to be secured in parallel fashion to a side of a tree trunk, an upper end of the vertical support comprising an upper anchor block adapted to be secured to a tree trunk, a lower end of the vertical support comprising a lower anchor block adapted to be secured to a tree trunk, the lower end adapted to be releasably connected to the lower anchor block and movable relative to the lower anchor block in a first plane generally parallel to a tree trunk and in a second plane corresponding to a tree trunk when the lower anchor block is secured to a tree trunk and the lower end is released from the lower anchor block, the lower anchor block comprising an extension portion that extends away from the vertical support in the second plane farther than the upper anchor block, the extension portion having a width less than the spacing of the substantially parallel spaced members and extending between the substantially parallel spaced members, the lower end of the vertical support further comprising a guide portion extending between the substantially parallel spaced members and adapted to slide on the extension portion and to be releasably connected to the extension portion at different positions in the first and second planes, the guide portion comprises a pair of spaced cross-members defining a guide channel around the extension portion of the lower anchor block;
    the horizontal support member and the vertical support member adapted to rotate as a unit relative to the tree trunk in the first plane and adapted to tilt as a unit in the second plane when the lower end of the vertical support is released from the lower anchor block.

2. The adjustable cantilever blind support of claim 1, wherein the extension portion is centered on the lower anchor block.

3. The adjustable cantilever blind support of claim 1, wherein the extension portion is offset on the lower anchor block.

4. The adjustable cantilever blind support of claim 1, wherein the extension portion has a width less than a width of the lower anchor block.

5. The adjustable cantilever blind support of claim 1, wherein the anchor blocks have V-shaped tree engaging faces and are adapted to be secured to a tree trunk with tension means adapted to be wrapped around a tree trunk.

6. The adjustable cantilever blind support of claim 1, wherein the horizontal support member comprises a pair of substantially parallel spaced members.

* * * * *